(12) United States Patent
Chang et al.

(10) Patent No.: US 8,312,311 B2
(45) Date of Patent: Nov. 13, 2012

(54) COMPUTER SYSTEM AND METHOD FOR AUTOMATICALLY OVERCLOCKING BASED UPON A SIGNAL STANDARD AND AN I/O SIGNAL OF OVERCLOCKING ELEMENT

(75) Inventors: Chuan-Te Chang, Taipei (TW); Ping-Hsu Wei, Taipei (TW)

(73) Assignee: Asustek Computer Inc., Taipei (TW)

( * ) Notice: Subject to any disclaimer, the term of this patent is extended or adjusted under 35 U.S.C. 154(b) by 396 days.

(21) Appl. No.: 12/400,125

(22) Filed: Mar. 9, 2009

(65) Prior Publication Data

US 2009/0259876 A1    Oct. 15, 2009

(30) Foreign Application Priority Data

Apr. 11, 2008  (TW) ................................ 97113384 A

(51) Int. Cl.
*G06F 1/00* (2006.01)

(52) U.S. Cl. ........................................................ 713/500

(58) Field of Classification Search ........... 713/400–600
See application file for complete search history.

(56) References Cited

U.S. PATENT DOCUMENTS

| | | | |
|---|---|---|---|
| 5,418,931 A | 5/1995 | Moorby | |
| 6,078,533 A | 6/2000 | Lee | |
| 6,535,988 B1 | 3/2003 | Poisner | |
| 6,813,724 B2 * | 11/2004 | Saito | 713/401 |
| 6,963,992 B1 | 11/2005 | Cheng et al. | |
| 7,017,058 B2 | 3/2006 | Chen | |
| 7,134,037 B2 | 11/2006 | Wilson et al. | |
| 7,469,355 B1 * | 12/2008 | Chong | 713/600 |
| 7,656,203 B2 * | 2/2010 | Lee et al. | 327/108 |
| 7,836,324 B2 * | 11/2010 | Subramanian et al. | 713/500 |
| 7,928,779 B2 * | 4/2011 | Song | 327/156 |
| 2002/0041335 A1 * | 4/2002 | Taraci et al. | 348/511 |
| 2005/0071705 A1 * | 3/2005 | Bruno et al. | 713/500 |
| 2006/0220723 A1 | 10/2006 | Chen et al. | |
| 2006/0259801 A1 * | 11/2006 | Chu et al. | 713/300 |
| 2007/0094522 A1 | 4/2007 | Lee | |
| 2008/0204094 A1 * | 8/2008 | Hur | 327/158 |
| 2008/0238507 A1 * | 10/2008 | Shim | 327/158 |

FOREIGN PATENT DOCUMENTS

| | | |
|---|---|---|
| CN | 101051271 | 10/2007 |
| TW | 567408 | 12/2003 |
| TW | 200639616 | 11/2006 |
| TW | 200722957 | 6/2007 |
| WO | WO 2005/073828 | 8/2005 |

OTHER PUBLICATIONS

European Office Action dated Nov. 24, 2011.

(Continued)

*Primary Examiner* — Mohammed Rehman
(74) *Attorney, Agent, or Firm* — McClure Qualey & Rodack LLP

(57) ABSTRACT

A computer system for automatically overclocking includes an overclocking element, a detecting circuit and a basic input/output system (BIOS). The overclocking element has a signal standard. The detecting circuit is used for acquiring an I/O signal of the overclocking element. The BIOS is used for comparing the signal standard with the I/O signal to obtain a comparing result. The BIOS is further used for adjusting a reference signal according to the comparing result. The reference signal is an input signal of the overclocking element.

12 Claims, 3 Drawing Sheets

OTHER PUBLICATIONS

Taiwanese language office action dated Nov. 29, 2011.
English language translation of abstract of TW 567408 (published Dec. 21, 2003).
English language translation of abstract of TW 200639616 (published Nov. 16, 2006).
English language translation of abstract of TW 200722957 (published Jun. 16, 2007).
English language translation of abstract of CN 101051271 (published Oct. 10, 2007).

* cited by examiner

COMPUTER SYSTEM AND METHOD FOR AUTOMATICALLY OVERCLOCKING BASED UPON A SIGNAL STANDARD AND AN I/O SIGNAL OF OVERCLOCKING ELEMENT

This application claims the benefit of Taiwan application Serial No. 97113384, filed Apr. 11, 2008, the subject matter of which is incorporated herein by reference.

BACKGROUND OF THE INVENTION

1. Field of the Invention

The invention relates to a computer system and a method for automatically overclocking and, more particularly, to a computer system and a method for automatically overclocking utilizing a hard device.

2. Description of the Related Art

Manufacturers usually set a standard operating range for electronic components when the electronic components leave factories. Overclocking is a technique for improving clock speed of the electronic components and makes operating range of the electronic components above the standard operating range set by the manufacturers. For example, users can overclock a central processing unit (CPU) chipset from a standard operating range 2 GHz to 2.1 GHz. Therefore, overclocking improves the efficiency of the cheap electronic components close to the efficiency of the expensive electronic components to make the users feel the electronic components well worth the cost. Furthermore, the efficiency of computer system can be improved as the operating range of the electronic components is enlarged. Therefore, many users expect to overclock the electronic components to the best operating range to make the computer system achieve the best efficiency.

In conventional overclocking method, users need to make the computer system access into a basic input/output system (BIOS) during booting to self adjust related setup parameters. When users adjust the setup parameters to be ones that make the system crash, the BIOS will record the setup parameters before the system crashes. The computer system will operate according to the setup parameters when users reboot the computer system. Therefore, users can adjust the setup parameters again according to the setup parameters recorded in the BIOS. In this way, the setup parameters can be adjusted to the optimization by continuous trial and error. However, using the method depends on long-term accumulated experience of users and is very difficult for users who are unfamiliar with the computer system.

As a result, the industry develops overclocking software currently. The overclocking software increases frequency and tests stability of the computer system successively. If the computer system is stable after the frequency is increased, the overclocking software will increase frequency again and reboot the computer system. If the computer system crashes, an automatic recovery mechanism (for example, a watchdog timer is used for detecting whether timeout occurs, the occurrence of timeout means that the system crashes) will send a signal to the computer system to reboot the computer system and read the setup parameters before the system crashes. The overclocking software regards the setup parameters as the best parameters to accomplish automatic overclocking. However, in the method, the computer system has to crash at least once to achieve the best overclocking settings.

BRIEF SUMMARY OF THE INVENTION

The invention is related to a computer system and a method for automatically overclocking. In the method, a reference signal is adjusted according to a comparing result resulting from comparing a signal standard of an overclocking element with an I/O signal.

According to an aspect of the invention, a computer system for automatically overclocking is provided. The computer system includes an overclocking element, a detecting circuit and a BIOS. The overclocking element has a signal standard. The detecting circuit is used for acquiring an I/O signal of the overclocking element. The BIOS is used for comparing the signal standard with the I/O signal to obtain a comparing result. The BIOS is further used for adjusting a reference signal according to the comparing result. The reference signal is an input signal of the overclocking element.

According to another aspect of the invention, a method for automatically overclocking is provided. The method includes steps as below. A signal standard of an overclocking element is provided. An I/O signal of the overclocking element is acquired. The signal standard is compared with the I/O signal to get a comparing result, and a reference signal is adjusted according to the comparing result. The reference signal is an input signal of the overclocking element.

These and other features, aspects and advantages of the present invention will become better understood with regard to the following description, appended claims, and accompanying drawings.

DETAILED DESCRIPTION OF THE EMBODIMENTS

The invention relates to a computer system for automatically overclocking including an overclocking element, a detecting circuit and a BIOS. The overclocking element has a signal standard. The detecting circuit is used for acquiring an I/O signal of the overclocking element. The BIOS is used for comparing the signal standard with the I/O signal to obtain a comparing result. The BIOS is further used for adjusting a reference signal according to the comparing result. The reference signal is an input signal of the overclocking element. Embodiments will be illustrated in detail as follows.

Figure 1:
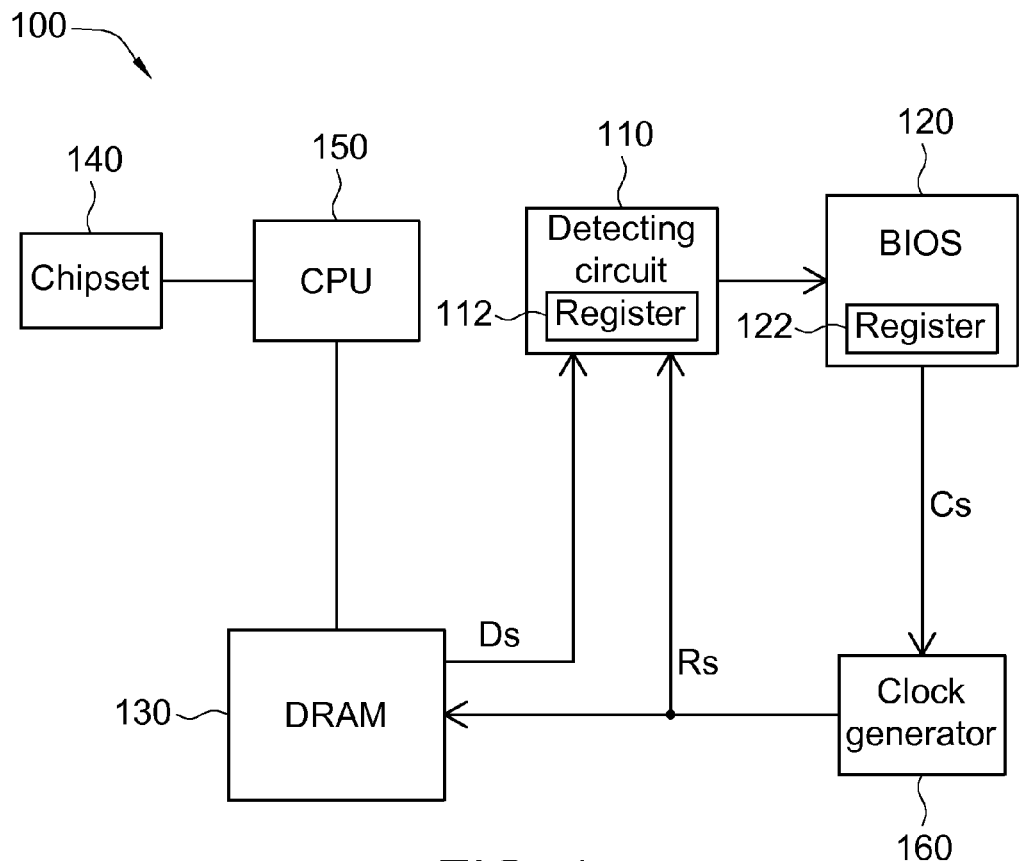
FIG. 1 is a block diagram showing a computer system for automatically overclocking according to a first embodiment of the invention.

FIG. 1 is a block diagram showing a computer system for automatically overclocking according to a first embodiment of the invention. The computer system 100 for automatically overclocking has an AMD architecture. The computer system 100 includes a detecting circuit 110 and a BIOS 120, a dynamic random access memory (DRAM) 130, a chipset 140, a CPU 150 and a clock generator 160. The CPU 150 is coupled to the chipset 140 and the DRAM 130, respectively.

In the embodiment, the DRAM 130 is an overclocking element and has a signal standard. The signal standard includes a rated setup time tDS2 and a rated hold time tDH2 of an I/O signal Ds of the DRAM 130. The I/O signal Ds is a signal transmitted to the CPU 150 from the DRAM 130 or a signal received by the DRAM 130 from the CPU 150.

The rated setup time tDS2 and the rated hold time tDH2 are the minimal setup time and hold time of the I/O signal Ds in the computer system 100 when the I/O signal Ds can be read correctly. Furthermore, the signal standard is corresponding to the I/O signal Ds. If the I/O signal Ds is a signal transmitted to the CPU 150 from the DRAM 130, the rated setup time tDS2 and the rated hold time tDH2 recorded in the signal standard are the minimal setup time and hold time when the signal transmitted from the DRAM 130 can be read normally. Furthermore, if the I/O signal Ds is a signal received by the DRAM 130 from the CPU 150, the rated setup time tDS2 and the rated hold time tDH2 recorded in the signal standard are the minimal setup time and hold time when the signal received by the DRAM 130 can be read normally.

The I/O signal Ds of the DRAM 130 is generated according to a reference signal Rs. The detecting circuit 110 is used for acquiring an I/O signal Ds of the DRAM 130. In the embodiment, the detecting circuit 110 is a phase detecting circuit and is used for getting a phase difference according to the reference signal Rs and the I/O signal Ds. Furthermore, the detecting circuit 110 preferably includes a register 112 for storing the phase difference. The BIOS 120 is used for reading the phase difference from the register 112 of the detecting circuit 110 and works out an I/O setup time tDS1 and an I/O hold time tDH1 of the I/O signal Ds according to the phase difference.

The BIOS 120 compares the I/O setup time tDS1 with the rated setup time tDS2 and compares the I/O hold time tDH1 with the rated hold time tDH2 to obtain a comparing result. The BIOS 120 further adjusts the reference signal Rs according to the comparing result. In this case, the BIOS 120 controls the frequency of reference clock Rs according to the rated setup time tDS2, the rated hold time tDH2, the I/O setup time tDS1 and the I/O hold time tDH1. Thereby, increasing frequency of data transmission from the DRAM 130 to the CPU 150 successively or increasing frequency of data transmission from the CPU 150 to the DRAM 130 successively can overclock the computer system 100 to the optimum state.

Preferably, the BIOS 120 adjusts the reference signal Rs next time according to the difference between the last rated setup time tDS2 and the last I/O setup time tDS1, and the difference between the last rated hold time tDH2 and the last I/O hold time tDH1. In this case, the BIOS 120 can adjust the reference signal Rs to make the I/O setup time tDS1 close to the rated setup time tDS2 but not less than the rated setup time tDS2. The BIOS 120 can also make the I/O hold time tDH1 close to the rated hold time tDH2 but not less than the rated hold time tDH2. In this way, the frequency of the reference signal Rs can be maximized. Meanwhile, the computer system 100 may finish overclocking without crash caused by failure of reading the I/O signal Ds correctly.

In general, the system crash often occurs when the I/O setup time tDS1 and the I/O hold time tDH1 of the I/O signal Ds are too small to be read. The computer system 100 will not crash so long as the I/O setup time tDS1 and the I/O hold time tDH1 of the I/O signal Ds are greater than the rated setup time tDS2 and the rated hold time tDH2. In the embodiment, the reference signal Rs is adjusted to make the I/O setup time tDS1 and the I/O hold time tDH1 of the I/O signal Ds closest to the rated setup time tDS2 and the rated hold time tDH2 to maximize the frequency of the reference signal Rs as well as overclock the overclocking element to the optimal range. Meanwhile, computer system 100 is in a stable state without crash.

Furthermore, in the embodiment, the BIOS 120 includes a register 122 for storing a table recording the rated setup time tDS2 and the rated hold time tDH2. Besides, the BIOS 120 transmits a control signal Cs to the clock generator 160. The clock generator 160 outputs the reference signal Rs according to the control signal Cs to adjust the reference signal Rs. The control signal Cs is, for example, a clock control signal having successive multiple pulses.

In the embodiment, although the control signal Cs output by the clock generator 160 is the clock control signal which is taken as an example herein, the invention is not limited thereto. In another embodiment, the control signal Cs output by the clock generator 160 is a strobe control signal. The strobe control signal makes the reference signal Rs have pulses only when the I/O signal Ds needs to be acquired. Thereby, power consumed by the reference signal Rs in level conversion can be saved.

Figure 2:
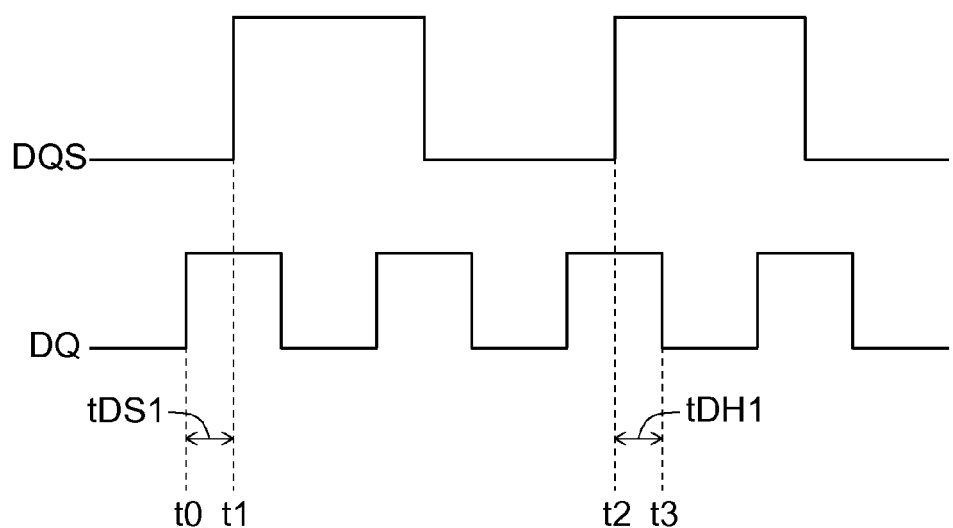
FIG. 2 is a timing diagram according to a first embodiment.

FIG. 2 is a timing diagram according to a first embodiment. As shown in FIG. 2, signals of pin DQ and pin DQS of a memory DDR3-800 produced by SAMSUNG are taken as an example. The signal of the pin DQS is the reference signal Rs and the signal of the DQ is the I/O signal Ds. The signal of the DQS has rising edges at the time point t1 and the time point t2, respectively. The I/O setup time tDS1 of the I/O signal Ds is a time span from the time point t1 to the level conversion before the time point t1, namely the time span |t0-t1|. The I/O hold time tDH1 of the I/O signal Ds is a time span from the time point t2 to the level conversion after the time point t2, namely the time span |t2-t3|. The rated setup time tDS2 and the rated hold time tDH2 are recorded in a data sheet provided by a manufacturer. The rated setup time tDS2 is 250 picoseconds, and the rated hold time tDH2 is 250 picoseconds. As a result, the signal of the pin DQ can be read normally when the I/O setup time tDS1 and the I/O hold time tDH1 of the signal of the pin DQ are greater than 250 picoseconds.

In the embodiment, the computer system 100 adopts an AMD architecture formed by the CPU 150, the chipset 140 and the DRAM 130 coupled with the CPU 150, respectively. The DRAM 130 may be an overclocking element, however, the invention is not limited thereto. In another embodiment, the computer system adopts an Intel architecture, and the chipset is respectively coupled with the CPU and the DRAM which is the overclocking element. The I/O signal is the signal transmitted to the chipset from the DRAM or the signal received by the DRAM from the chipset. The reference signal is the input signal of the DRAM.

Figure 3:
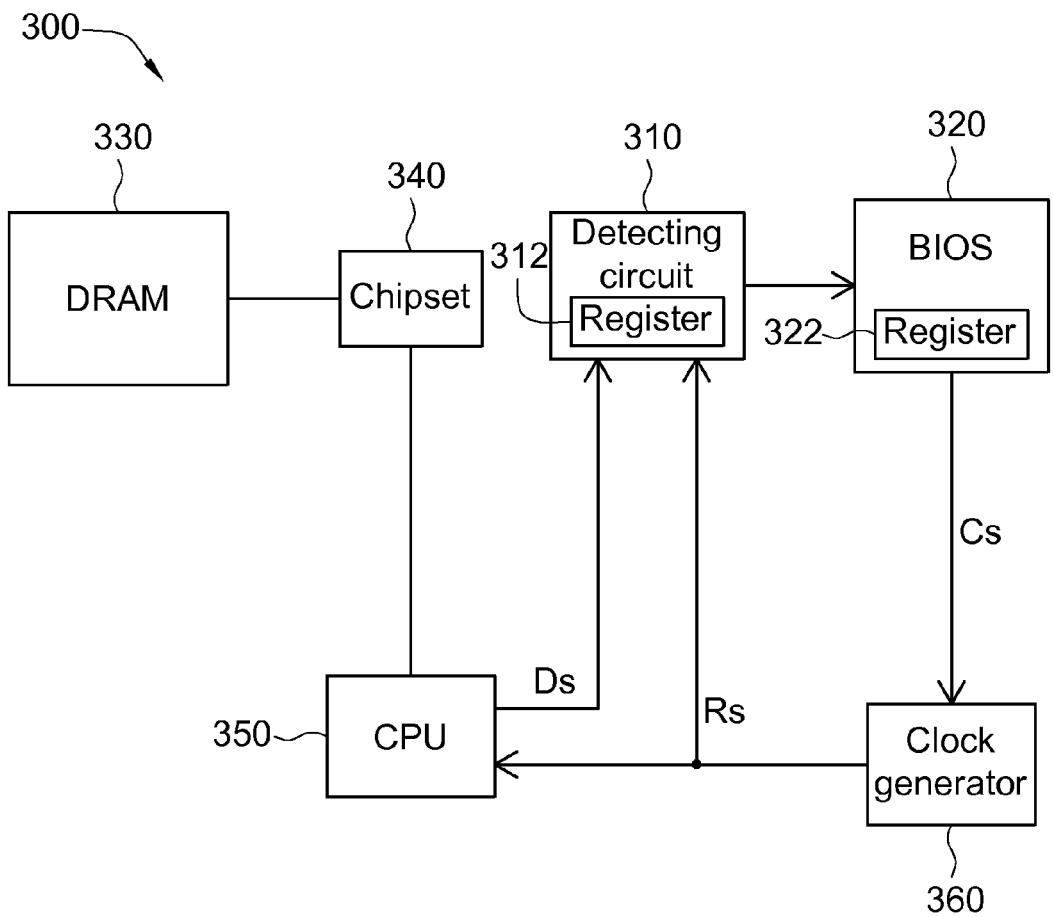
FIG. 3 is a block diagram showing the computer system for automatically overclocking according to another embodiment of the invention.

Furthermore, the overclocking element also can be the CPU in the INTEL architecture. As shown in FIG. 3, it is a block diagram showing the computer system for automatically overclocking according to another embodiment of the invention. The difference between the computer system 300 in the embodiment and the computer system is that the chipset 340 of the computer system 300 for automatically overclocking is respectively coupled with the DRAM 330 and the CPU 350. The I/O signal Ds is the signal transmitted to the chipset 340 from the CPU 350 or the signal received by the CPU 350 from the chipset 340. The BIOS 320 compares the I/O signal Ds with the corresponding signal standard to get a comparing result for adjusting the reference signal Rs hereby. The reference signal Rs is the input signal of the CPU 350. The parts which are the same with that of the computer system 100 are not described for concise purpose.

Besides, the overclocking element can also be the chipset. The I/O signal Ds is the signal transmitted to the CPU from the chipset or the signal received by the chipset from the CPU. The BIOS compares the I/O signal with the corresponding signal standard to get a comparing result for adjusting the reference signal hereby. The reference signal is the input signal of the chipset.

Figure 4:
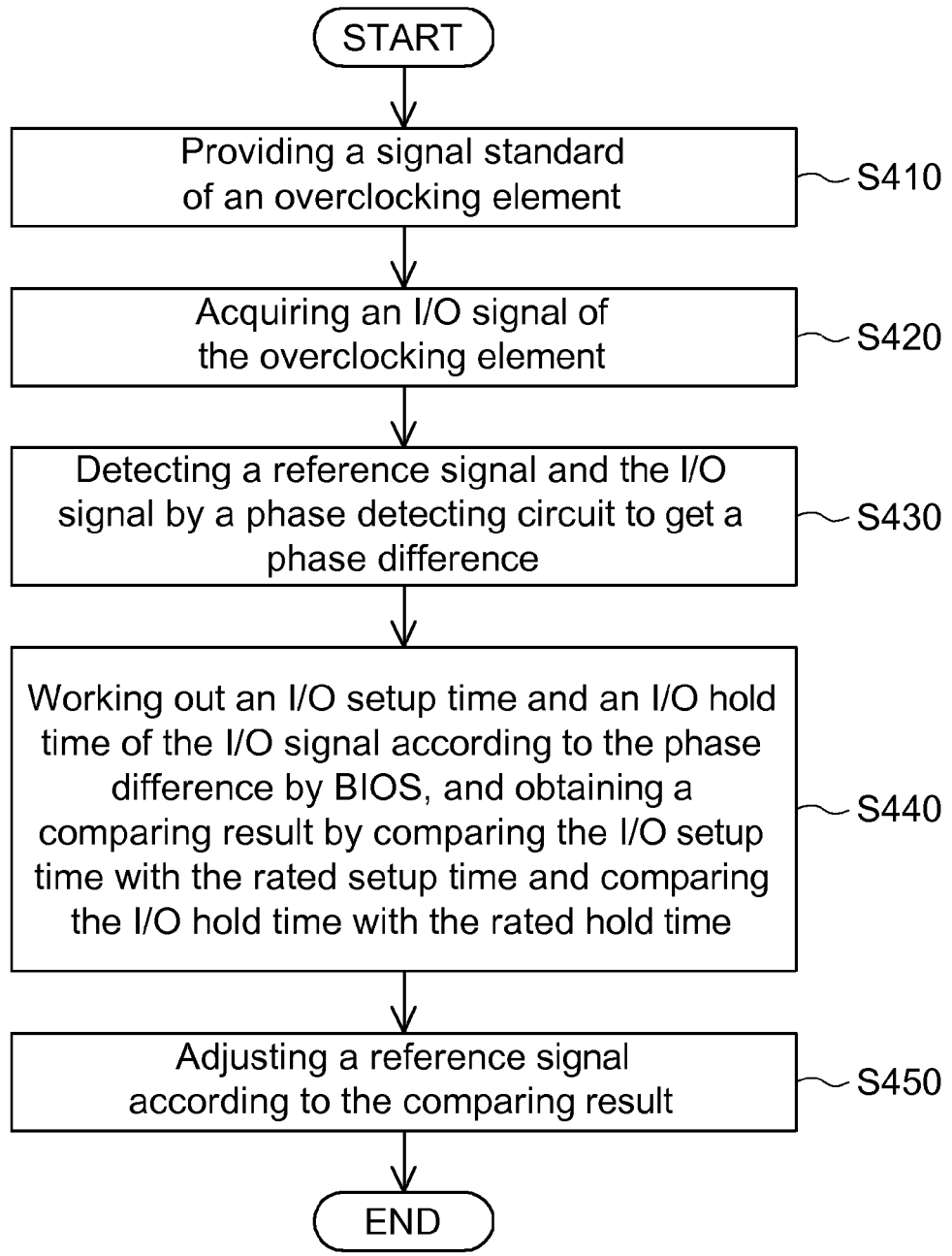
FIG. 4 is a flow diagram of the method for automatically overclocking according to the embodiments of the invention.

FIG. 4 is a flow diagram of the method for automatically overclocking according to the embodiment of the invention. The steps of the method for automatically overclocking of the embodiment in FIG. 4 are performed by the computer system 100, but the invention is not limited thereto. Persons having ordinary skills in the art should understand the steps and sequences of the method for automatically overclocking and make various modifications and changes according to actual application status.

First, as shown in the step S410, the signal standard of the overclocking element (the DRAM 130) is provided. In the embodiment, the signal standard includes the rated setup time tDS2 and rated hold time tDH2 of the I/O signal Ds of the DRAM 130.

Second, as shown in the step S420, the I/O signal Ds of the overclocking element (the DRAM 130) is acquired. The I/O signal Ds is the signal transmitted to the CPU 150 from the DRAM 130 or the signal transmitted to the DRAM 130 from the CPU 150.

Third, as shown in the step S430, the phase difference is obtained through detecting the reference signal Rs and the I/O signal Ds by the phase detecting circuit 110.

Fourth, as shown in the step S440, an I/O setup time tDS1 and an I/O hold time tDH1 of the I/O signal Ds are worked out by the BIOS 120 according to the phase difference. A comparing result is obtained by comparing the I/O setup time tDS1 with the rated setup time tDS2 and comparing the I/O hold time tDH1 with the rated hold time tDH2.

Fifth, as shown in the step S450, the reference signal Rs is adjusted according to the comparing result. The reference signal Rs is the input signal of the overclocking element (DRAM 130).

The method for automatically overclocking can be performed repeatedly to make the I/O setup time tDS1 close to the rated setup time tDS2 but not less than the rated setup time tDS2, and make the I/O hold time tDH1 close to the rated hold time tDH2 but not less than the rated hold time tDH2. In this way, the reference signal Rs can be overclocked to the best range to accomplish overclocking automatically.

In the computer system and method disclosed in the above embodiments of the invention, whether the I/O setup time and the I/O hold time of the I/O signal conform to the established rated setup time and the rated hold time is determined to adjust the frequency of the reference signal. The basis of adjusting reference signal is the difference between the rated setup time and the I/O setup time. The difference can also be between the rated hold time and the I/O hold time. In this way, the frequency of the reference signal can be added successively, to make the I/O setup time close to the rated setup time but not less than the rated setup time, and make the I/O hold time close to the rated hold time but not less than the rated hold time. In this way, the computer system can be automatically overclocked to the optimum state without the system crash. Thereby, it can further improve the efficiency of the computer system to make the users feel the computer system well worth the cost.

To conclude, although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A computer system for automatically overclocking, comprising:
   an overclocking element having a signal standard;
   a detecting circuit for acquiring an input/output (I/O) signal of the overclocking element; and
   a basic input/output system (BIOS) for comparing the signal standard with the I/O signal to get a comparing result and adjusting a reference clock according to the comparing result, the reference clock is outputted by a clock generator;
   wherein the reference clock is the input signal of the overclocking element, and the detecting circuit is a phase detecting circuit for detecting the reference clock and the I/O signal to get a phase difference, the BIOS gets the comparing result according to the phase difference, wherein the BIOS works out an I/O hold time of the I/O signal according to the phase difference and compares the I/O hold time with a rated hold time to get the comparing result.

2. The computer system for automatically overclocking according to claim 1, wherein the signal standard comprises the setting of a rated setup time of the I/O signal of the overclocking element.

3. The computer system for automatically overclocking according to claim 2, wherein the BIOS works out an I/O setup time of the I/O signal according to the phase difference and compares the I/O setup time with the rated setup time to get the comparing result.

4. The computer system for automatically overclocking according to claim 1, wherein the signal standard comprises the setting of a rated hold time of the I/O signal of the overclocking element.

5. The computer system for automatically overclocking according to claim 1, wherein the BIOS works out the I/O signal according to the phase difference.

6. The computer system for automatically overclocking according to claim 1, wherein the I/O signal comes from a chipset, a dynamic random access memory (DRAM) and a central processing unit (CPU) or the combination thereof.

7. A method for automatically overclocking, comprising:
   providing a signal standard of an overclocking element;
   acquiring an I/O signal of the overclocking element; comparing the signal standard with the I/O signal to get a comparing result, wherein the step of comparing the signal standard with the I/O signal to get the comparing result comprises the step of:
   detecting a reference clock and the I/O signal by a phase detecting circuit to get a phase difference;
   obtaining the comparing result according to the phase difference by a BIOS; and
   adjusting the reference clock according to the comparing result, wherein the reference clock is outputted by the clock generator;
   wherein the reference clock is an input signal of the overclocking element,
   wherein the step of obtaining the comparing result according to the phase difference comprises working out an I/O hold time of the I/O signal according to the phase difference and comparing the I/O hold time with a rated hold time by the BIOS to get the comparing result.

8. The method for automatically overclocking according to claim 7, wherein the signal standard comprises the setting of a rated setup time of the I/O signal of the overclocking element.

9. The method for automatically overclocking according to claim 8, wherein the step of comprises the step of:
working out an I/O setup time of the I/O signal according to the phase difference and comparing the I/O setup time with the rated setup time by the BIOS to get the comparing result.

10. The method for automatically overclocking according to claim 7, wherein the signal standard comprises the setting of a rated hold time of the I/O signal of the overclocking element.

11. The method for automatically overclocking according to claim 7, wherein the step of acquiring the I/O signal of the overclocking element comprises the step of:
working out the I/O signal according to the phase difference by the BIOS.

12. The method for automatically overclocking according to claim 7, wherein the I/O signal comes from a chipset, a DRAM and a CPU or the combination thereof.

* * * * *